United States Patent Office 3,149,423
Patented Sept. 22, 1964

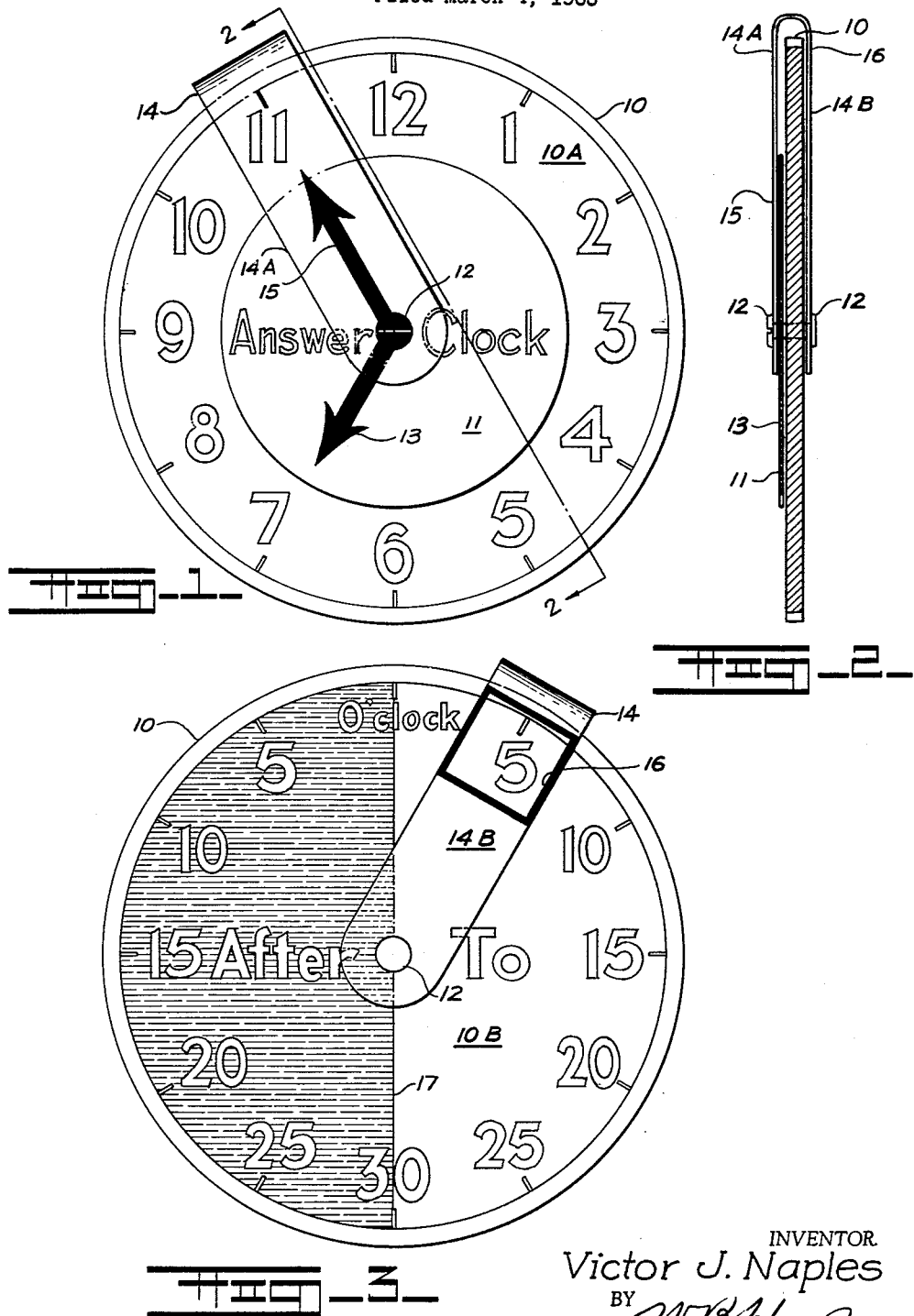

3,149,423
TIME TEACHING DEVICE
Victor J. Naples, 2692 Rexford Road, Youngstown, Ohio
Filed Mar. 4, 1963, Ser. No. 262,435
1 Claim. (Cl. 35—39)

This invention relates to a time teaching device and more particularly to a device which can be used by a child in learning how to tell time.

The principal object of the invention is the provision of a simple and inexpensive time teaching device.

A further object of the invention is the provision of a time teaching device which provides a clock-like representation on one side which may be set by a child and a minute indicator on the other side which may then be referred to by the child to determine the particular time shown on the first side.

A still further object of the invention is the provision of a time teaching device which incorporates a double-faced member one side of which carries indicia representing a clock dial and hands and the other side of which carries indicia representing minutes and wherein means forming one of the hands on one side continues to the other side so that it can also indicate the minutes.

A still further object of the invention is the provision of a time teaching device arranged so that a child using the device in learning to tell time learns to associate the location of the minute hand with the number of minutes before or after the indicated hour.

The time teaching device disclosed herein comprises an improvement in the art in that it is an extremely simple, easily operated device with but two moving parts arranged on a disc, one side of which carries the representation of a clock face with the twelve hour numerals in their normal positions and the other side of which is divided into right and left half sections, one portion of which is preferably colored or shaded so as to be readily distinguishable from the other and which portions are indicated as being "to" or "after" together with representations of the minutes 5 through 30 on each half. Thus, a child using the device sets the hands on the clock dial side to the particular time desired and then merely refers to the opposite side to find out exactly how many minutes before or after the hour is correctly indicated on the first side. The device thus incorporates mental activity with physical activity and the association necessary to facilitate learning how to tell time.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a front elevation of the time teaching device.

FIGURE 2 is a cross section on line 2—2 of FIGURE 1.

FIGURE 3 is a back elevation of the time teaching device.

By referring to the drawings and FIGURE 1 in particular, it will be seen that the time teaching device disclosed herein comprises a circular body member 10 having a clock dial including the numbers 1 through 12 inclusive on the front side thereof as seen in FIGURE 1, together with a disc 11 of transparent material pivoted to a central aperture in the member 10 by a pivot 12. The disc 11 has the representation of an hour hand 13 thereon so that by revolving the disc 11 by engaging its face or its periphery with the fingers of the user the representation of the hour hand 13 will move as desired. By referring now to FIGURES 1 and 2 of the drawings, it will be seen that a U-shaped member of transparent material in which the arms are closely spaced with respect to one another and shown in inverted position in FIGURES 1 and 2 and indicated by the numeral 14 is provided with apertures adjacent its ends which are engaged on the pivot 12 on the opposite sides of the circular body member 10 as best seen in FIGURE 2 of the drawings so that the U-shaped member 14 may be moved in a circular motion based on the pivot 12 through a full 360°. The one side of the U-shaped member 14 and that side thereof indicated at 14A in FIGURE 1 of the drawings has a representation of a minute hand 15 thereon so that when the U-shaped member 14 is moved in a circular motion the minute hand indicates the numerals 1 to 12 on the front of the circular body member 10. Thus, it may be moved to any time indicating position as, for example, that shown in FIGURE 1 of the drawings wherein the time is indicated at 5 minutes to 7:00 with the representation of the hour hand 13 on the disc 11 pointing at the numeral 7 on the body member 10, while the representation of the minute hand 15 on the U-shaped body member and on the front side 14A thereof specifically is pointed toward the numeral 11 on the body member 10. By referring now to FIGURE 3 of the drawings, the opposite or back side of the time teaching device may be seen and it will be observed that the U-shaped body member 14 has not been moved from the position shown in FIGURES 1 and 2 of the drawings and that it carries a square frame 16 which frames and therefore draws attention to or indicates one of a series of numerals positioned on the back side 10B of the member 10. These numerals comprise the numerals 5, 10, 15, 20 and 25 on the right half of the device as seen in FIGURE 3 and the numerals 5, 10, 15, 20 and 25 on the left half thereof, together with the numeral 30 at the immediate bottom center portion thereof. The back half of the time teaching device is divided by a vertical line 17 with the portion thereof to the right of the vertical line 17 being indicated as "to" and the portion to the left thereof being indicated by the word "after." If desired, either half may be shaded or colored to distinguish more readily from the other and at the top central portion the words "o'clock" appear. It will be observed that due to the arrangement and construction hereinbefore disclosed the positioning of the front portion 14A of the inverted U-shaped member 14 so that the representation of the minute hand 15 thereon points toward the numeral 11 on the front side 10A of the body member 10 results in the square window frame 16 on the back side 14B of the U-shaped member 14 indicating and in effect picturing the numeral 5 on the righthalf of the back portion of the device which is associated with the notation "to." Thus, a child setting the disc 11 so that the hour hand representation thereon as indicated by the numeral 13 points toward the numeral 7 and moving the inverted U-shaped member 14 so that the representation of the minute hand thereon indicates the numeral 11 will have set the face of the clock to indicate 5 minutes to 7:00. The child then turns the device over and finds that the window 16 now correctly indicates "5" and the word "to" appears therebelow so that the child thereby immediately learns that the minute hand on the front of the device pointing to the numeral 11 indicates "5" minutes "to" the particular hour.

The same situation occurs whenever the inverted U-shaped member 14 is moved to position the representation of the minute hand 15 on the front side 14A thereof adjacent any of the other numerals on the lefthand of the front of the device; in other words, any of the numerals 7, 8, 9, 10 and 11 with the corresponding numerals indicating minutes on the righthand of the back portion being indicated by the window frame 16.

When the child manipulates the minute hand by moving the inverted U-shaped member 14 and then refers to the minutes indicated thereby in the window frame 16 on the back side of the device he builds a mental association with the particular numeral on the face of the dial with the corresponding minute numeral on the back, and in this way quickly learns to tell time.

Those skilled in the art will observe that by substituting numerals representing multipliers and multiplicands for the numerals representing hours and minutes the device may be used to teach the multiplication tables.

It will thus be seen that a simple, inexpensive and efficient device for teaching time has been disclosed and having thus described my invention, what I claim is:

A time teaching device comprising a circular body member having a central pivot member, a transparent disc of relatively smaller diameter than said body member having a central aperture rotatably mounted on said pivot member, said disc having a representation of an hour hand thereon and said circular body member having numerals thereon arranged in the manner of a clock dial, a transparent U-shaped body member the arms of which are relatively closely spaced to one another and having apertures adjacent the ends thereof engaged on said pivot member on the opposite sides of said circular body member, said U-shaped member being rotatably mounted relative to said circular body member, said U-shaped body member having a representation of a minute hand on the arm thereof adjacent said disc and the other arm of said U-shaped body member having a window frame thereon near the base of the U-shape thereof, the opposite side of said circular body member from the side having the numerals thereon having secondary numerals corresponding with minutes before and after the hour arranged on the respective left and right halves thereof and radially spaced so that said secondary numerals representing said minutes before and after the hour progressively and individually register in said window frame on said U-shaped body member when the same is rotated on said body member.

References Cited in the file of this patent

UNITED STATES PATENTS

| | | |
|---|---|---|
| 1,850,184 | Spainhower | Mar. 22, 1932 |
| 2,137,646 | Dorr et al. | Nov. 22, 1938 |
| 2,172,450 | Pitcher | Sept. 12, 1939 |
| 2,583,797 | Rosfelder | Jan. 29, 1952 |
| 2,655,739 | Wilmington | Oct. 20, 1953 |
| 2,797,499 | Lagerdahl | July 2, 1957 |
| 3,003,258 | Stefano | Oct. 10, 1961 |

FOREIGN PATENTS

| | | |
|---|---|---|
| 926,995 | France | Oct. 16, 1947 |